(12) United States Patent
Freedman

(10) Patent No.: US 7,838,799 B2
(45) Date of Patent: Nov. 23, 2010

(54) COFFEE ROASTER METHOD AND CONTROL

(76) Inventor: Jeffrey Freedman, 139 Knollwood Rd., Watchung, NJ (US) 07069-6245

( * ) Notice: Subject to any disclaimer, the term of this patent is extended or adjusted under 35 U.S.C. 154(b) by 1093 days.

(21) Appl. No.: 11/535,479

(22) Filed: Sep. 26, 2006

(65) Prior Publication Data
US 2009/0238929 A1 Sep. 24, 2009

Related U.S. Application Data

(63) Continuation-in-part of application No. 11/185,541, filed on Jul. 19, 2005, now abandoned, which is a continuation-in-part of application No. 10/043,873, filed on Jan. 10, 2002, now Pat. No. 6,942,887, application No. 11/535,479, which is a continuation-in-part of application No. 11/105,321, filed on Apr. 13, 2005, now abandoned, which is a continuation-in-part of application No. 11/085,868, filed on Mar. 23, 2005, now abandoned, which is a continuation-in-part of application No. 11/059,291, filed on Feb. 15, 2005, now abandoned, which is a continuation-in-part of application No. 10/043,873, filed on Jan. 10, 2002, now Pat. No. 6,942,887.

(60) Provisional application No. 60/261,124, filed on Jan. 12, 2001.

(51) Int. Cl.
A23N 12/08 (2006.01)
F27D 7/04 (2006.01)

(52) U.S. Cl. .................. 219/385; 219/386; 219/400; 99/476; 34/586; 34/594

(58) Field of Classification Search ................ None
See application file for complete search history.

(56) References Cited

U.S. PATENT DOCUMENTS

| 270,503 A | 1/1883 | Stopple |
|---|---|---|
| 3,964,175 A | 6/1976 | Sivetz |
| 4,178,843 A | 12/1979 | Crabtree et al. |

(Continued)

FOREIGN PATENT DOCUMENTS

JP 62-058977 3/1987

OTHER PUBLICATIONS

Home Coffee Roasting: The Next Trend, Tea & Coffee Trade Journal, pp. 49-62, Reader Service No. 39.

*Primary Examiner*—Joseph M Pelham
(74) *Attorney, Agent, or Firm*—Leo Stanger

(57) ABSTRACT

A method and apparatus for pan roasting a mass of green coffee beans at rest by heat conduction from the pan bottom to the beans mass. A glass cover and smoke filter closes the roasting chamber. A radial blower operates at slow speed to draw ambient air and vacate smoke from the chamber to permit visual monitoring of roasting beans. Periodically, the fan can operate a high speed for a short time to mix or swirl the bean mass without substantial cooling them. The blower can sequence through high and low speed cycles until roasting completes and heating ceases. A high speed cool down phase removes remaining chaff, smoke, and quick cools the beans to preserve freshness. Electric power drives the blower and resistant heating element. The system enables the operator to use appearance, sound, smell, and time to determine roasting completeness.

32 Claims, 8 Drawing Sheets

U.S. PATENT DOCUMENTS

| | | | |
|---|---|---|---|
| 4,196,342 A * | 4/1980 | Chailloux | 219/385 |
| 4,325,191 A | 4/1982 | Kumagai et al. | |
| 4,326,114 A | 4/1982 | Gerling et al. | |
| 4,425,720 A | 1/1984 | Elevitch | |
| 4,455,763 A | 6/1984 | Elevitch | |
| 4,484,064 A | 11/1984 | Murray | |
| 4,489,506 A | 12/1984 | Brown et al. | |
| 4,494,314 A | 1/1985 | Gell, Jr. | |
| 4,602,147 A * | 7/1986 | Gell | 219/509 |
| 4,683,666 A | 8/1987 | Igusa et al. | |
| 4,698,916 A | 10/1987 | Farber | |
| 4,875,904 A | 10/1989 | Munk | |
| 5,083,502 A | 1/1992 | Enomoto | |
| 5,269,072 A * | 12/1993 | Waligorski | 34/594 |
| 5,272,299 A | 12/1993 | Ovadia | |
| 5,355,783 A | 10/1994 | Cochran | |
| 5,359,788 A * | 11/1994 | Gell, Jr. | 34/360 |
| 5,368,875 A | 11/1994 | Hibi et al. | |
| 5,441,344 A | 8/1995 | Cook, III | |
| 5,481,962 A | 1/1996 | Tedesco | |
| 5,500,237 A * | 3/1996 | Gell et al. | 426/466 |
| 5,564,331 A * | 10/1996 | Song | 99/469 |
| 5,609,097 A | 3/1997 | Newnan | |
| 5,614,239 A | 3/1997 | Tedesco | |
| 5,749,288 A * | 5/1998 | Skaling | 99/483 |
| 5,902,623 A | 5/1999 | Cochran | |
| 5,943,790 A * | 8/1999 | Gell, Jr. | 34/606 |
| 5,958,494 A | 9/1999 | Tidland et al. | |
| 5,960,561 A * | 10/1999 | Parodi et al. | 34/550 |
| 6,000,144 A | 12/1999 | Bussmann et al. | |
| 6,036,988 A | 3/2000 | Lemme et al. | |
| 6,051,266 A | 4/2000 | Totsuka | |
| 6,053,093 A * | 4/2000 | Gerhardt et al. | 99/331 |
| 6,065,226 A * | 5/2000 | Gell, Jr. | 34/594 |
| 6,112,644 A * | 9/2000 | Song | 99/323.7 |
| 6,123,971 A | 9/2000 | Tedesco | |
| 6,195,912 B1 * | 3/2001 | Moon et al. | 34/577 |
| 6,214,397 B1 | 4/2001 | Tidland | |
| RE37,238 E * | 6/2001 | Song | 99/469 |
| 6,558,726 B2 * | 5/2003 | Erickson et al. | 426/466 |
| 6,942,887 B1 * | 9/2005 | Freedman | 426/466 |
| 2001/0001349 A1 * | 5/2001 | Moon et al. | 34/577 |
| 2003/0061942 A1 * | 4/2003 | Erickson et al. | 99/348 |

* cited by examiner

FIG. 11
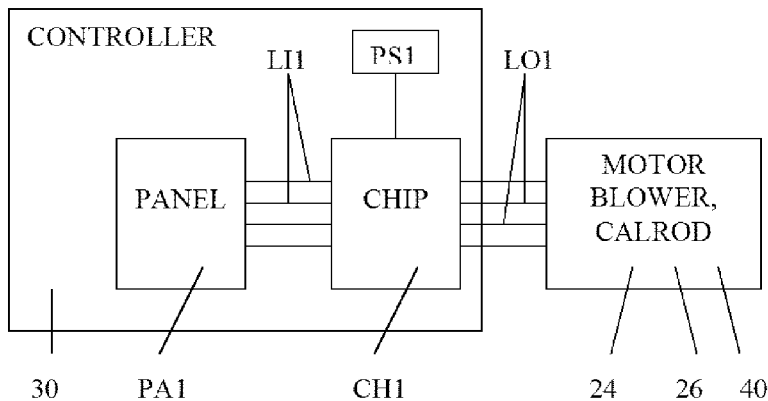
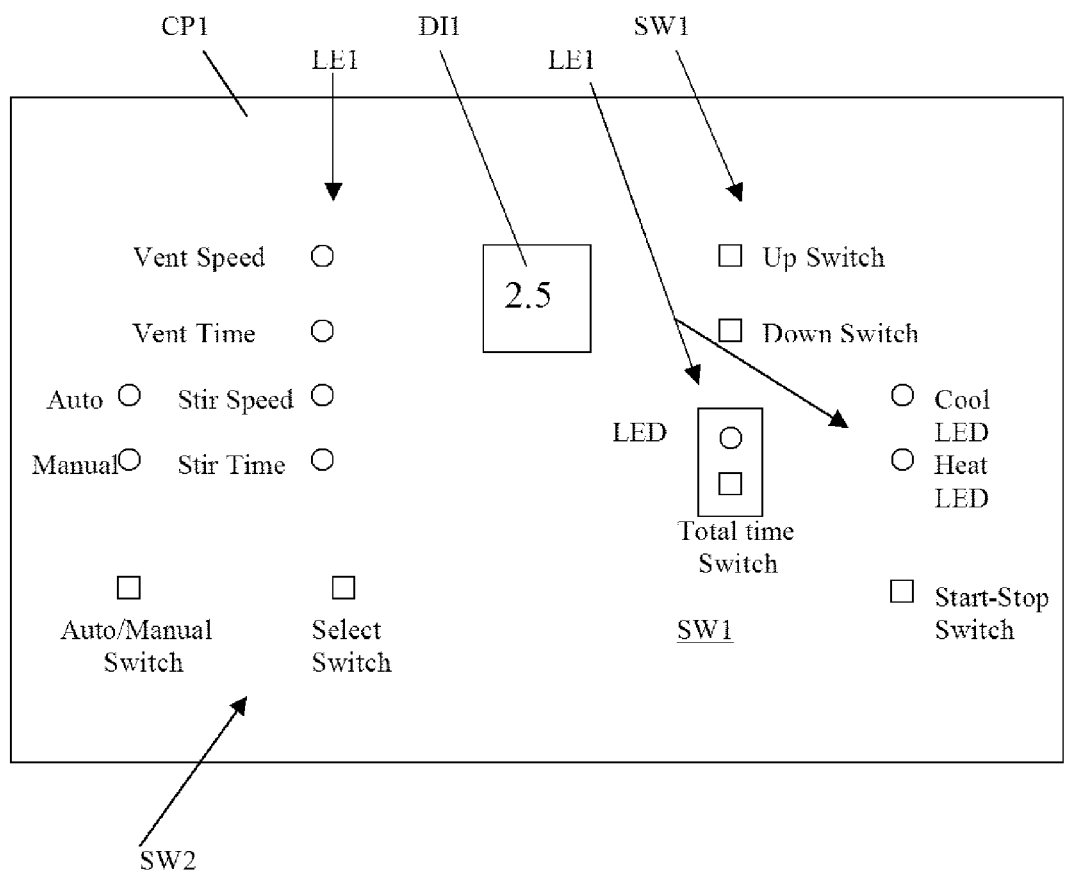
FIG. 12

COFFEE ROASTER METHOD AND CONTROL

RELATED APPLICATIONS

This is a Continuation-in-Part of U.S. patent application Ser. No. 11/185,541 filed Jul. 19, 2005 now abandoned which is a Continuation-in-Part of U.S. patent application Ser. No. 10/043,873 filed Jan. 10, 2002 now U.S. Pat. No. 6,942,887, which claims priority of Provisional Application Ser. No. 60/261,124 filed Jan. 12, 2001. This is also a Continuation-in-Part of U.S. patent application Ser. No. 11/105,321 filed Apr. 13, 2005 now abandoned, which is a continuation in part of Ser. No. 11/085,868 filed Mar. 23, 2005 now abandoned, which is a Continuation-in-Part of U.S. patent application Ser. No. 11/059,291 now abandoned, filed Feb. 15, 2005, which is a continuation in part of Ser. No. 10/043,873 filed Jan. 10, 2002 now U.S. Pat. No. 6,942,887 which claims priority of Provisional Application Ser. No. 60/261,124 filed Jan. 12, 2001. Applicant claims priority of all these applications.

BACKGROUND

Green unroasted coffee beans remain useful for extensive time periods. When roasted, unground coffee beans begin to lose flavor in a day and shall have lost almost all flavor in a week. Ground coffee deteriorates even faster.

As the people become more sophisticated about food and coffee, the consumer market demand grows for better quality coffee beverages. Specialized coffee shops have arisen to meet this demand. However, many of these shops provide no in-store roasting. Roasted beans are shipped from a central location to shops all over the country. The coffee served at these shops has spent the prime of its life in transit. The pre-roasted whole-bean coffee one buys in supermarkets is even older.

Freshly roasted and ground coffee is vastly superior compared with these pre-roasted products. Various systems are known that attempt to roast green coffee beans and otherwise process them shortly before grinding and using them to make fresh coffee. See for example, U.S. Pat. Nos. 3,964,175, 4,326,114, and 6,123,971. These disclosures recognize the value of rapid cool down of roasted beans but suffer from various process steps that prevent production of a good quality product. For example, these systems fail to enable the operator to visually inspect the roasting bean color to control various process steps that can produce a better quality final roasted bean.

Various characteristics of the roasting beans can be used to indicate or measure quality during the roasting and cooling cycle, such as the color of the roasting beans, smell of the rising aroma, crackling sounds of the beans, and the length of time, roasting energy consumed, and bean temperature. Technical problems must be solved to effectively use one or more of these characteristics. For example, the generally known fluidized bed coffee bean roaster uses streams of radiantly heated hot air to carry, circulate, and roast the beans. However, the operator of these systems cannot observe the individual bean color but only a swirling mass during the roasting. Operation of other household units of the drum type cannot visually inspect the beans while roasting. All of these units do not attempt to minimize the smoke produced such that they need to be vented or used outside to avoid creating a polluted environment. Similarly many or these units fail to collect chaff and spread chaff over an already polluted environment. Most of the household fluidized bed units roast only 2 to 3 oz. (¼ to ½ cup) of green beans and have little tolerance for different amounts. These limitations are due to design but are mainly due to the principles of operation and power use of the fluidized bed devices.

SUMMARY OF EXEMPLARY EMBODIMENTS OF THE PRESENT INVENTION

The roasters according to the principles of the present invention provide substantial benefits over previously known systems and enable the operator to use one or a combination of up to all of the above mentioned characteristics of roasting coffee beans while avoiding or solving the above mentioned technical problems.

One exemplary embodiment according to this invention includes a small batch coffee roaster for the home and restaurant markets to produce automatically a repeatable roast coffee bean in the ½-4 green bean cup range (3 oz. 1⅓ lbs.) which will give optimal control of roasting bean color which is the main determinant of doneness, fast cooling of the beans once roasting is complete, collection of chaff, and elimination of most smoke and odor. This embodiment enables the operator to smell a small amount of smoke and to listen for crackling sounds as a further or alternate indication of doneness.

Another exemplary embodiment according to the principles of the present invention includes an alternate more effective chaff catching, smoke filtering, and processing design and technique. This embodiment lends itself well to not only ½-4 cups of green beans including, if desired, one or more layers of beans for home or commercial use.

All embodiments are capable of providing a roasting method that preferably substantially roasts the beans by conduction heating when they are at the rest so that color can be observed through a transparent cover. As roasting heat is applied by conduction, a blower exhausts the air and steam through a filter that traps most smoke particles and circulates air within the pan at an air speed that does not disturb the resting, roasting beans. Preferably, the blower moves the air at high speed to agitate, stir, or circulate the beans for a short time and then cuts-off or gradually reduces to low speed to allow the beans to come to rest again for at-rest roasting. Because the blower operates at increased speed for one or more short time periods, the beans retain most of their residual heat and are not significantly cooled while they are stirred or swirled about the roasting chamber. The roasting continues with the beans retaining most of their residual heat when the blower speed is reduced and the beans come to rest. Preferably, the heater continues to supply heat energy through the at-rest roasting and the stirring cycles. As described below, these cycles repeat as necessary until the operator determines that the beans are almost fully roasted. Due to exothermic processes within the beans they continue to heat up when external heat is removed so they are subject to external cooling slightly before the final roast color is seen. Although some chaff will be transported by air currents during the slow speed phase, most chaff will be collected during the high blower speed phase. The subject systems can roast the beans by a process that separates the roasting and cooling phases even though the roasting beans are air stirred because the residual heat of each bean is not removed until the final rapid cool down phase, more fully described below. Systems according to the principles of the present invention lend themselves well to use electricity as the only needed source of energy for all system functions.

According to another embodiment, a control with a panel sets parameters changeable by a user.

BRIEF DESCRIPTION OF DRAWINGS

Other and further benefits and advantages of systems and methods according to the principles of the present invention will become apparent with the following detailed description of exemplary embodiments when taken in view of the appended drawings, in which:

FIG. 11 is a block diagram of a control embodying the invention.

FIG. 12 is a block diagram of a panel illustrating an embodiment of the invention.

DETAILED DESCRIPTION OF EXEMPLARY EMBODIMENTS

Figure 1:
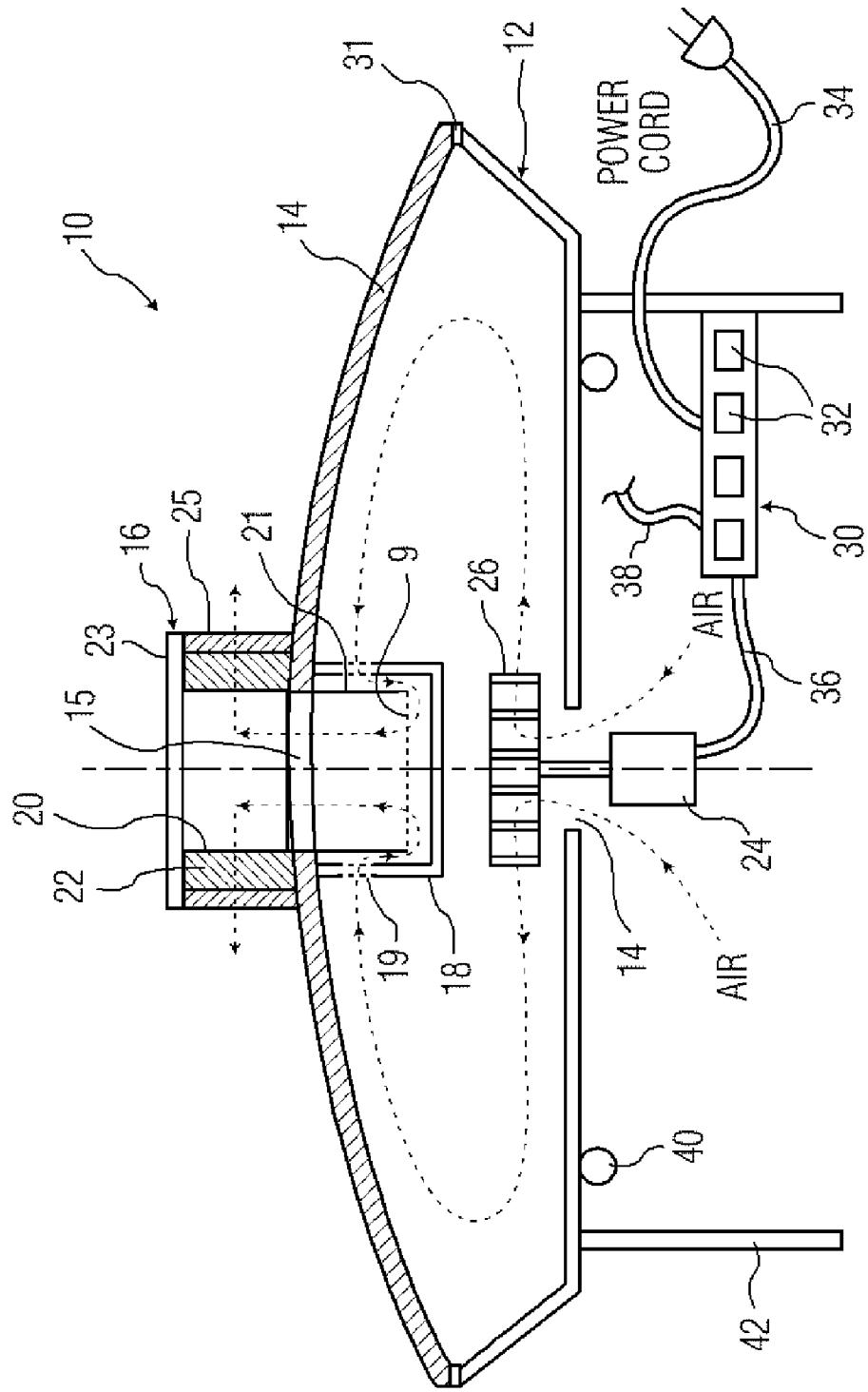
FIG. 1 is a pictorial view of a vertical cross section through the center of one exemplary embodiment according to the principles of the present invention.
Figure 2:
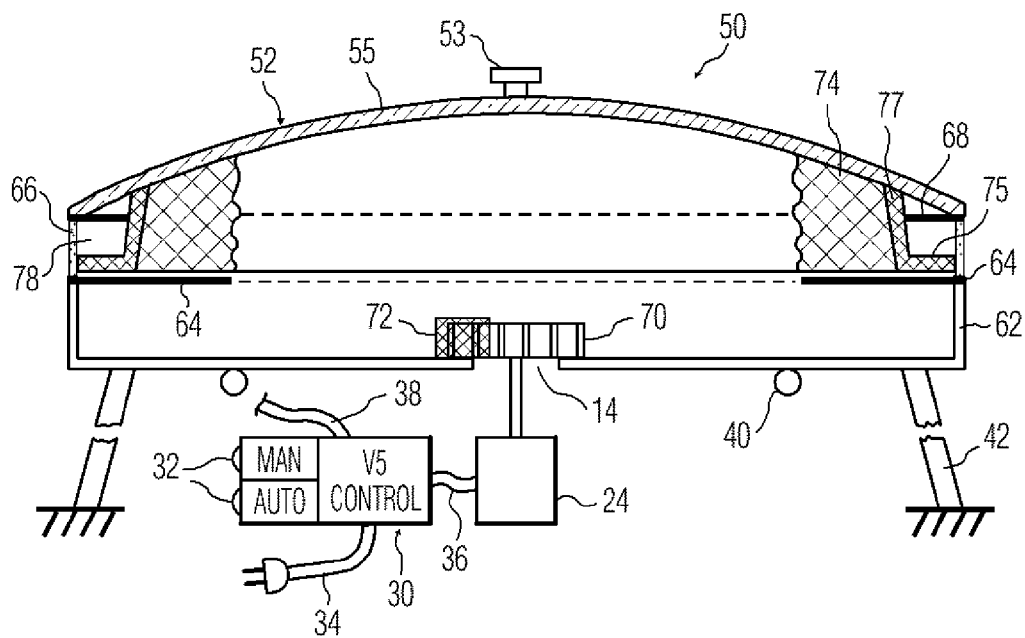
FIG. 2 is similar to FIG. 1 showing an alternate embodiment according to the principles of the present invention.
Figure 3:
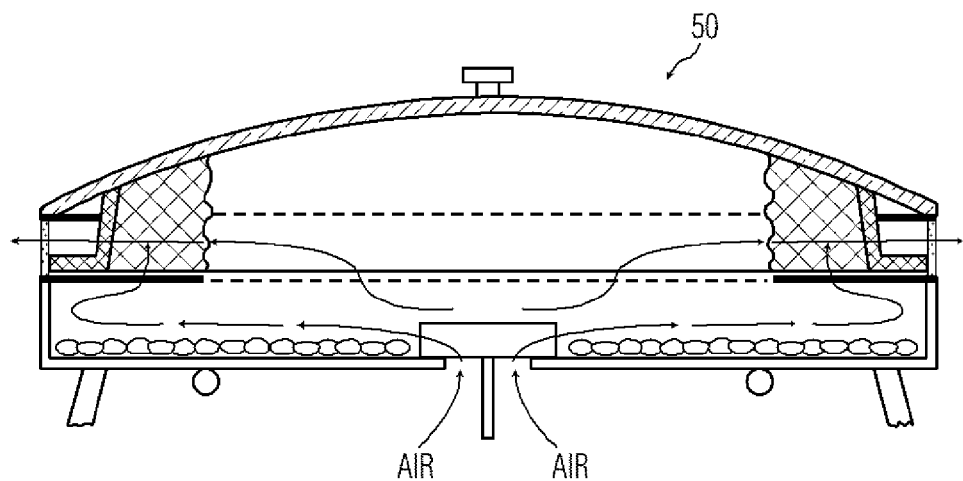
FIG. 3 is similar to FIG. 2 showing a single layer of beans therein and the general airflow paths generated by the blower at low speed.
Figure 4:
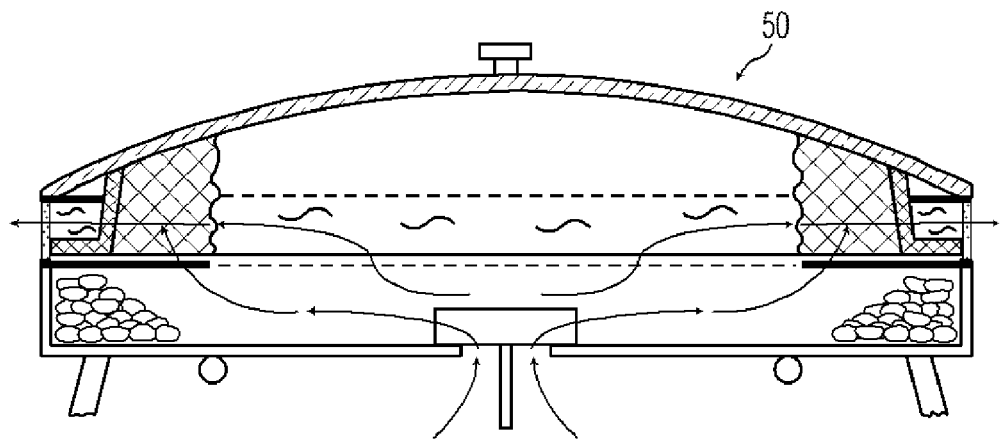
FIG. 4 is similar to FIG. 3 depicting the beans and airflow and chaff with the blower at high speed.
Figure 5:
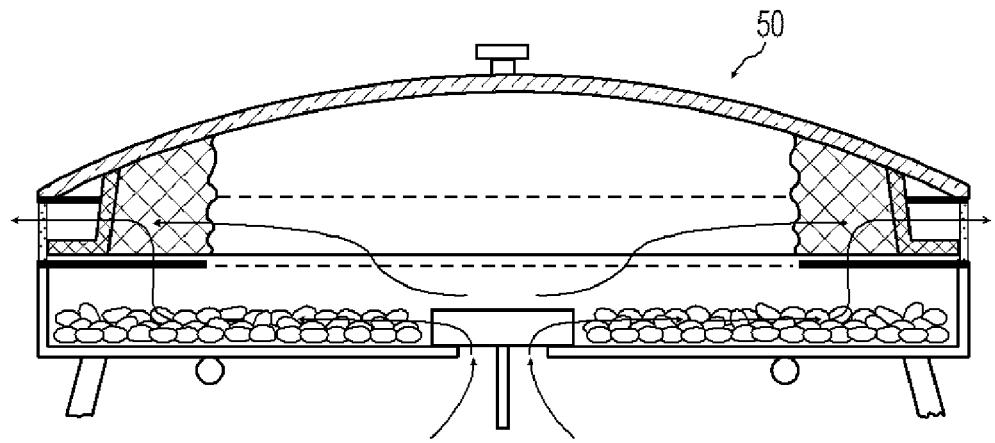
FIG. 5 is similar to FIG. 3 depicting a multi-layer mass of green beans in the pan.
Figure 6:
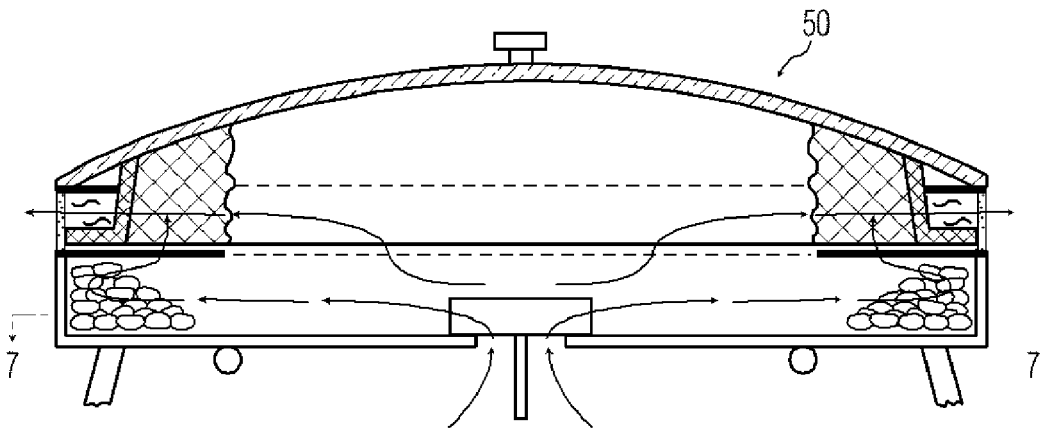
FIG. 6 is similar to FIG. 5 depicting the beans during high blower speed.
Figure 7:
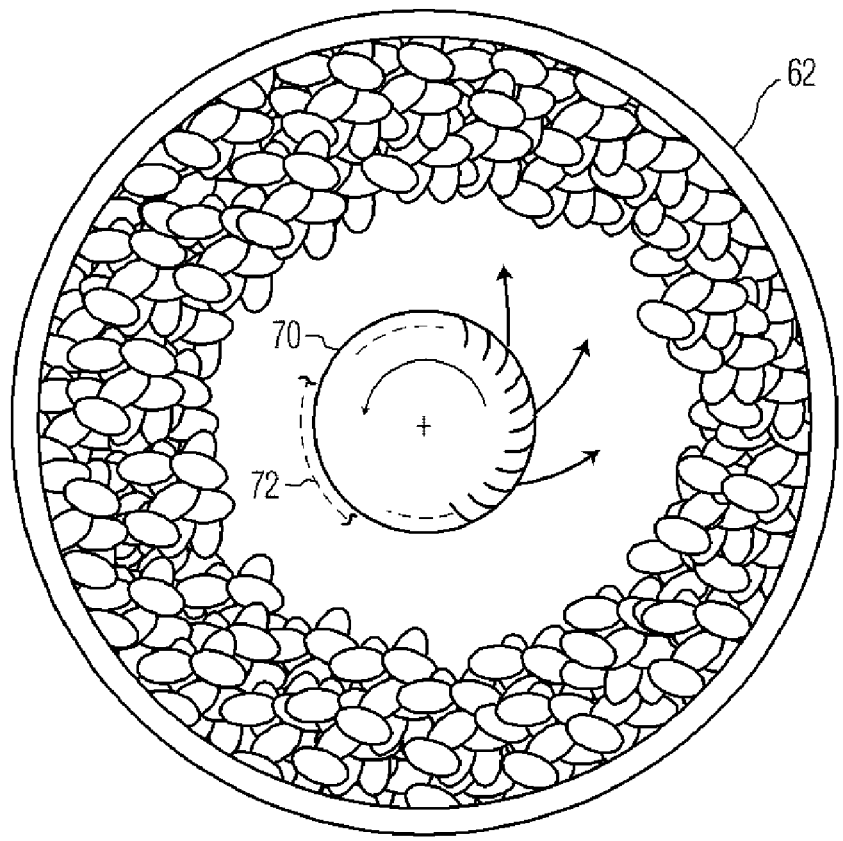
FIG. 7 is a section view of the pan and beans taken along line 7-7 of FIG. 6.
Figure 8:
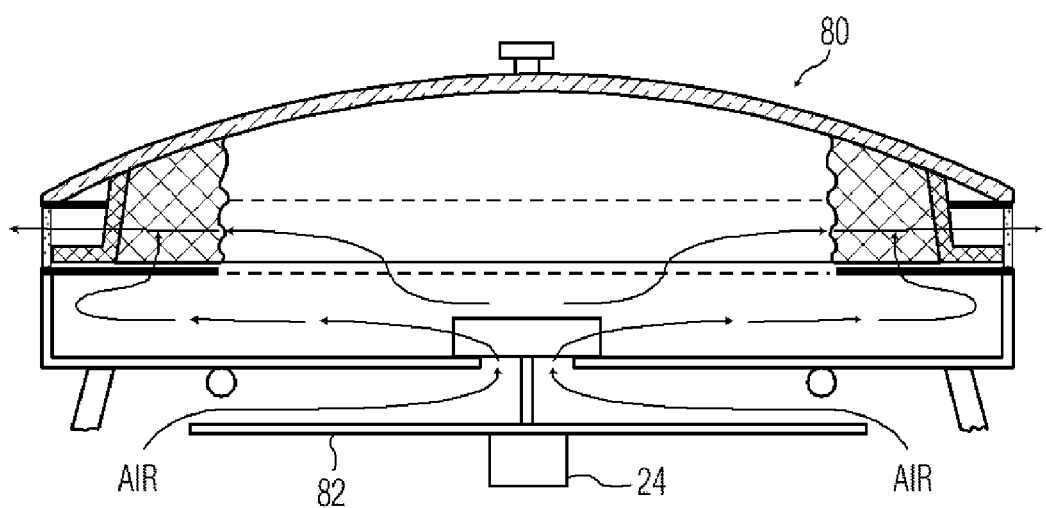
FIG. 8 is similar to FIG. 2 for a further alternate embodiment and showing general blown air flow thereof.

In FIG. 1, a coffee bean roasting system 10 according to the principles of the present invention includes a metal skillet-like pan 12 having a suitable shape and size to accommodate one or more layers of green coffee beans and function as a roasting chamber therefor. In this example pan 12 is circular but could be octagonal, hexagonal, or other suitable shape with a bottom that is generally flat or one which could be slightly sloping toward the center, if desired. Legs 42 support the pan and other assemblies above a counter top or other suitable surface. The pan bottom defines a center opening 14 to enable airflow and accommodate the shaft of motor 24 that drives a radial blower 26 as more fully described below. Brackets or other suitable members (not shown) mount AC motor 24 to the pan such that blower 26 rotates to cause air to draw and to circulate within the roasting chamber. A mesh screen about the blower removes ambient particles and in particular prevents the beans from interfering with the blower.

Pan 12 cooperates with removable transparent cover 14 to close the roasting chamber. Cover 14 is flat or dome shaped and is preferably made of glass although other materials are possible. Cover 14 defines an opening 15 generally at the top thereof. A filter and chaff catcher assembly 16 mounts to top 14 about opening 15. Assembly includes a chaff catching cup 18 the lower portion of which is solid and the upper portion of which is defined by screen 19 with openings of about ⅛ inch that permits the passage of chaff but denies the passage of coffee beans. A solid baffle 21 forces the exhausting gasses downward below the baffle, small mesh screen 9, and an upper screen portion 21 that permits the gasses to pass. A solid top or cover 23 prevents gasses from exhausting out the top of assembly 16. While filter medium 22 serves to filter out smoke particles and, in this embodiment, odor filter 25 filters most but not all odors so that the operator can smell the aroma of the roasting beans. Filter 25 could be a carbon filter. According to an embodiment, filter medium 22 is a 1.0 to 0.1 micron HEPA or ULPA filter for smoke removal generally available in the industry. The filter opening size would depend upon the size and extent of the smoke particles the manufacturer desires to emit into the ambient. The assembly can be mounted to the glass top or dome by various bonding materials such as epoxies or adhesives and screw type devices to enable removal of chaff and catching cup and occasional filter replacement. It is preferred that the continuous edge of top 14 include a suitable sealing material 31 such as such as food-grade sealants to substantially prevent air circulating within the chamber from escaping between the pan and the dome.

System 10 further includes a controller 30 with a panel that includes certain push buttons or dials 32 that enable the operator to set automatic heat energy and blower applications or manually set or override such settings. Power cord 34 provides standard house 110 volt house power or 220 volt power as desired. Power cord 36 provides power and speed control to the motor 24 and power cord 38 provides heat energy to resistive heater 40, which may be in the form of a coil or cal rod, that in turn heats the bottom of pan 12.

In one method example, the unit of FIG. 1 was operated in the manual mode. Approximately one cup of green beans was spread evenly on the bottom of the 12-inch diameter pan 12 with four-inch high sidewalls. Opening 14 was 3 inches in diameter as was the opening in the top of glass dome 14. The blower 26 was a LAU radial blower #C2895767, 3 and $13/16^{th}$ inches by 1 and 1/32 inches high radial blower with 30 back-curved blades, CCW Rotation in plan view.

The glass lid 14 with filtration assembly 16 attached was placed on the pan to close the chamber.

The heating rod 40 was energized for 10-12 minutes at 1400 Watts.

The stationary layer of roasting beans was visible through the glass lid and the sounds (crackling) of roasting were clearly heard. The aroma of roasting coffee beans was discernable without excessive smoke filling the room.

Once the required or sufficient degree of doneness was perceived by sight, smell, sound, and/or time, the heating unit was turned off and the cooling unit (the motor-blower 24-26) was turned on at about 6500 RPM.

Some smoke was visible on the outside of the filtration unit early in the cooling cycle. As the roasted beans were swirled around inside the roasting chamber during the cooling cycle, they were being cooled by the outside drawn and circulating air. As they swirled around, chaff was loosened and deposited into the chaff cup or catcher, and the pressure differential caused by the motor-blower unit caused the effluent to pass through the $1/8^{th}$ inch grid around the baffle and out through the smoke and odor filters.

After about six to eight minutes of cooling cycle, the beans were cooled sufficiently to stop the roast and retain the previously observed doneness. Due to exothermic processes within the beans they continue to heat up when external heat is removed so they are subject to external cooling slightly before the final roast color is seen. The motor-blower unit was turned off. The glass lid was removed and the roasted beans emptied out and stored in sealed glass jars. Later, as needed, the stored beans were ground and processed into a fresh cup of coffee beverage.

In another method example, cover 14 is removed and a layer or more of green coffee beans is deposited on the floor of pan 12. The operator selects the mode, e.g. "Manual", and applies power to heating rod or element 40 that, in turn, heats by conduction the bottom of pan 12 and the resting beans. As the beans begin to roast the operator can inspect the bean color and listen to the roasting sounds as desired. In addition, the operator can turn the blower assembly on a relatively slow speed such as 1000 RPMs to force the smoke and steam out through the filter assembly to preserve bean visibility. The radial blower 26 draws outside air in and circulates the air generally as shown in dotted lines in FIG. 1. Because of the slow blower speed and the continued application of heating energy to element 40, the beans remain at rest and continue to absorb roasting energy. During this phase, the blower draws fresh air into the chamber and forces air with smoke and steam out of the chamber in the path shown by the dotted lines. Some chaff that separates from the roasting beans may be carried out with the exhausting air but when the chaff clears the bottom of the baffle 21 it remains at the bottom of the cup 18 due to its weight and inertia. The smoke and steam, however, continue upward and through the filters 22 and 25 and exit the system.

According to one embodiment, the arrangement is set so if the operator notes an excessive burning smell or excessive color change in one segment of the bean body, the operator can sequence the select key SE1 and use the up key UK1. This applies more power to motor 24, which increases the blower speed to cause the beans to fly outward and against the sides of pan 12 and against each other. Some beans would also circulate back toward the center of the pan in a swirling motion. In effect, the beans would be effectively stirred within the chamber. In one example, the high blower speed for a 12-inch pan is 6000 RPM. This stirring cycle should be short, e.g. about 10 to 20 seconds, so that the body of beans is not significantly cooled but instead retain most of their residual heat. Preferably, the power continues to be applied to the heater 40 so that the net cooling is reduced during this phase. Also, during this high-speed cycle, most of the chaff is carried up and out of the pan itself and deposited in cup 18. This chaff removal and collection also aids the operator's visual inspection of the roasting beans when the beans come to rest. Once the beans are stirred, the operator can manually reduce the blower speed by pressing the appropriate button on controller 30. Preferably, the controller reduces blower speed gradually so the beans distribute along the pan bottom evenly. This can be done manually by rheostat control or automatically by programmed IC chip in controller 30. The beans will come to rest on the pan bottom where they will resume their roasting by way of the heat energy applied by conduction through pan bottom. Some of the beans may be piled up at the outer portions of pan 12, but this will not affect the quality of the roasting method and over time, the vibrations or the system will cause those beans to migrate toward the center of the pan bottom. Also, since most beans have one flat side (the other is rounded), they tend to come to rest with flat side down for best conductive heat transfer with pan bottom. Ramping the speed up and down causes the blower to go briefly through its resonant speeds. The general vibrations and the vibrations produced as the blower goes through its resonant speeds as well as the changes in speed during ramping causes the mass of beans to spread fairly evenly over the circular pan.

The high and low speed cycles can be repeated as desired by the operator. In one example of the method, the low-speed cycles lasted two to three minutes and the high-speed cycles lasted about 20 seconds. Three to four cycles were needed for fully roasting the beans.

Once the beans were fully roasted, power to heater 40 was cut off and the blower set for high speed. This high-speed cycle is a rapid cool-down cycle not only to rapidly cool the beans to capture flavor but also to separate and carry off the remaining chaff from the stock of roasted beans. This cool-down cycle lasted about 6 minutes in this example.

An alternate system 50 according to the principles of the present invention is shown in FIGS. 2 to 8 where common reference characters refer to similar elements to system 10. System 50 includes metal pan 62 defining opening 14 in the pan bottom. In one example, the pan 62 was 12 inches in diameter with four-inch high sidewalls. The pan bottom can be high finish aluminum and thick enough to cooperate with rod 40 to provide even heating to the bean layer.

A cover assembly 52 functions to close the roasting chamber, collect floating chaff, and filter most smoke and steam from exiting gases and particles. Assembly 52 preferably includes a glass dome shaped cover 55 with handle 53 and smoke filter 66 that preferably extends completely around the periphery of the outer edge of cover 55. Filter 66 can be secured to cover 55 by seal 68 to form a single unit raised and lowered by handle 53. In one example seal 68 extends along and is integral with the top of filter 66 and is shaped to releasably mate with the outer edge of glass cover 55. A further seal 64 lines and is integral with the bottom of filter 66 and functions to releasably seal filter 66 of the cover assembly 52 to the top edge of pan 62 when assembly 52 is placed on the pan. Seals 64, 68 can comprise any suitable material such as food-grade sealants. Preferably, filter 66 and it seals 64, 68 can be selectively removed from cover 55 to permit cover and filter cleaning and chaff removal as desired. It has been determined that a filter selection that blocks all but 1.0 micron particles is suitable. However, a 0.1 micron filter is preferred to prevent too much smoke for inside use but allow some smoke to exit the system for operator indication of roasting completion by the smell parameter. Alternately, a carbon post-filter can be used in combination therewith. Crackling sounds can also emanate with such filters. Assembly 52 can further include a chaff screen 77 that can extend to the inner surface of dome 55, as shown, or be spaced below it. Screen 77 has openings that approximate $\frac{1}{8}^{th}$ inch to enable floating chaff to penetrate the screen but reject beans from such translating through. Any chaff that translates through screen 77 will be blocked from exiting the system by filter 66. Instead, chaff will accumulate in space 78 on the top of floor 75, where they can be discarded after the process is completed. A smaller opening, chaff-blocking screen (not shown) can be placed along the inside surfaces of filter 66 to prevent chaff from jamming the filter ports.

It will be understood that seals 64, 68, filter 66 and screen 74 are shown extending completely about the system periphery as represented by the dashed lines. However, it would be within the scope of the invention for those elements to extend substantially about the periphery so long as they function to remove substantial smoke to permit inside, non-vented use and allow some odor to emanate to aid the operator. By extending completely about the periphery, assembly 52 maximizes the exhaust area, the area to filter the smoke, and the space to catch the chaff. An advantage of the wide peripheral filter is that it does not clog as easily as smaller filters.

This arrangement also enables the same size filters to be stacked one atop the other (not shown) to increase these capacities even further for restaurant applications or applications where a lot of beans are roasted to a dark color, resulting in a great deal of smoke.

Motor 24 and controller 30 can be mounted to the pan 62 or to the legs or to some frame member (not shown) as desired.

Radial blower 70 draws air from outside the system and provides air circulation as further described below. Screen or mesh 72 is mounted on the floor of the pan 62 about blower 70 to prevent beans from engaging the rotating peripherally-distributed and radially-extending blower blades 73 of the blower. Only part of screen 72 is shown for simplicity. The screen 72 is in the form of an upside-down saucer having a flat top and a cylindrical wall about a vertical axis. The motor 24 is positioned so that the blower 70 with its blades 73 projects inside the heated space. The opening 14 is small enough so the pan 62 covers the blades 73 completely from underneath. This assures a static pressure difference between the space of the blower and the remainder of the chamber. It also produces a swirling movement of air that, depending on the speed, moves the beans circumferentially, and/or blows out the oils and steam and smoke. The motor 24 is outside the heated space and in the flow of the incoming cold air stream which keeps the motor cool. A flat baffle or disk, such as 82 of the embodiment of FIG. 8, can be added on top of the motor but below the bottom surface of the pan 62 to keep the motor even cooler and during the final cooling operation to draw cooling air in across the outside bottom surface of the pan, thereby decreasing the cooling cycle time.

Figure 9:
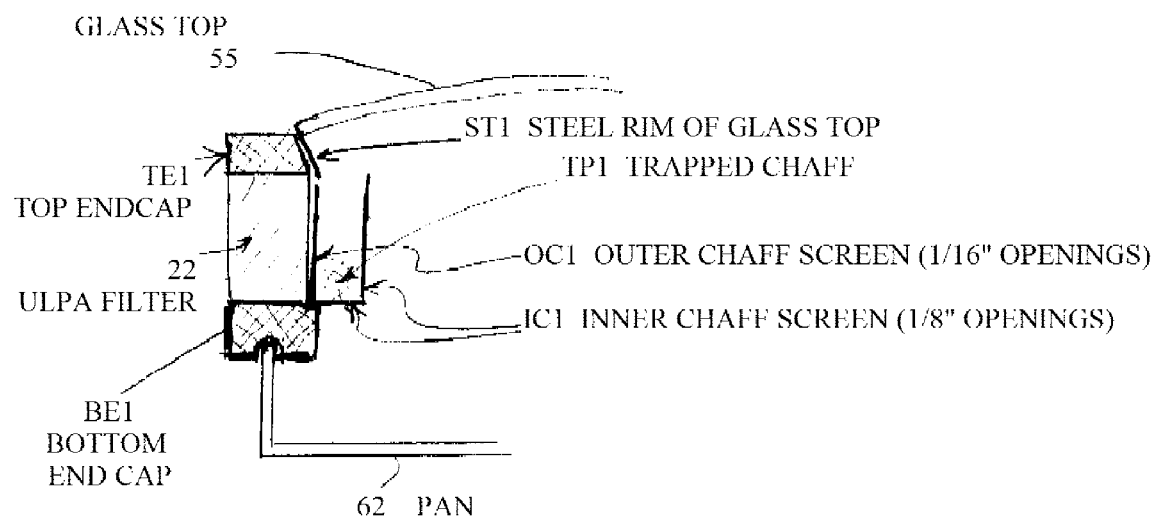
FIG. 9 is a sectional view of a portion of a portion of another embodiment of the invention.

FIG. 9 is a sectional view of an embodiment of the filter screen 77 showing filter screening in the form of a one piece assembly for use in any of the other embodiments. Here, a circular bottom end cap BE1, secured peripherally around a vertical cylindrical edge of the pan 62, and a top end cap TE1, secured to a steel rim ST1 of the glass top 55, hold the cylindrical ULPA filter 22 between them. A cylindrical outer chaff screen OC1 inside the ULPA filter 22 exhibits 1/16" openings. A cylindrical inner chaff screen IC1 with an L-shaped cross-section inside the outer chaff screen OC1 present 1/8" openings. The cylindrical inner chaff screen OC1 prevents larger debris such as the beans from hitting the ULPA filter 22 and the cylindrical outer chaff screen IC1 traps chaff TP1 between the filters OC1 and IC1. According to an embodiment the filters OC1, IC1, caps BE1 and TE1, as well as the ULPA filter 22 form a single assembly.

ULPA filters are used in high grade medical filters. They filter out 0.1 microns and above—just like this filter. This includes pollen, dust mites, mold spores, and most cigar/cigarette smoke. If run in "fan only" mode (heater off), this roaster will take ambient air and remove the same contaminants as a medical ULPA filter, and deliver the cleaned air back to the environment.

Figure 10:
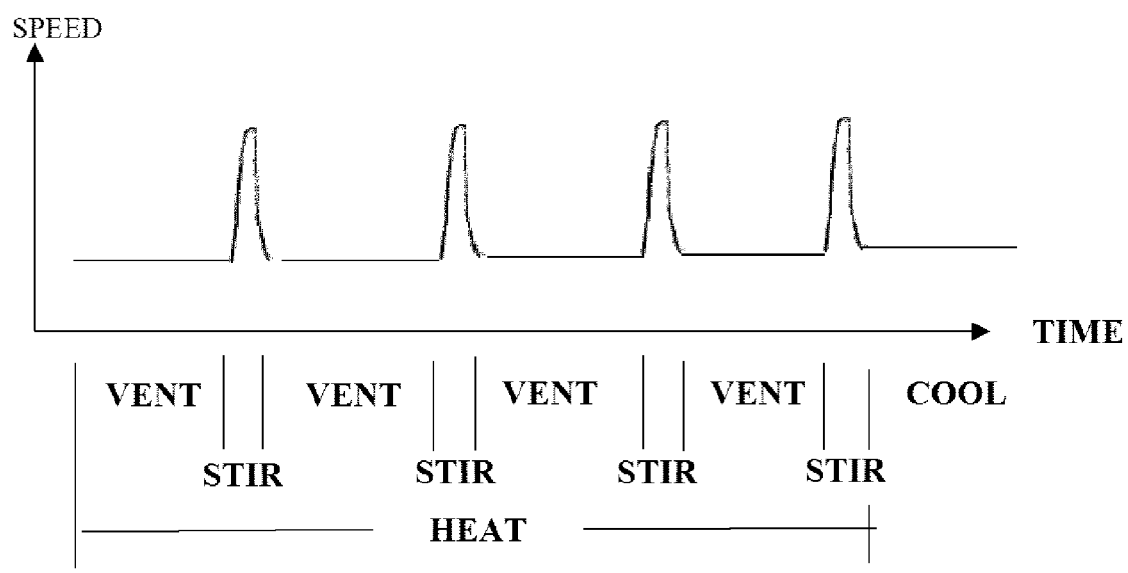
FIG. 10 is a graph illustrating the operation of an embodiment of the invention.

In operation, one or more layers of green coffee beans are spread on the floor of pan 62. FIG. 10 illustrates the operation of the blower 70 and the heating element 40. FIG. 10 illustrates the operation in terms of speed with respect to time. Here, the process begins with vent and proceeds thereafter with stir, vent, stir, vent, etc. Heating occurs during both the stir and the vent periods. The vent operation removes the steam and smoke that may accumulate.

As shown in FIG. 10, power is applied to heating element 40 to heat the bottom of pan 62. The pan bottom, in turn, heats the resting beans by conduction. Simultaneously at the start of the heat application or shortly thereafter, blower 70 is activated at slow speed, e.g. 1000-1500 RPM, to remove smoke and steam. This is the first vent cycle shown in FIG. 10. Blower 70 draws outside air in through opening 14, circulates it outward and circumferentially. See FIG. 3. This relatively slow-moving circulating air carries the smoke and steam in a swirling motion and upward and outward pattern, thence out through screen 74 and filter 66. Note the beans continue to rest and roast for the heat energy applied by element 40 is sufficient to roast the beans regardless of the cooling effect applied by the slow moving air. In addition, the operator can easily visually and audibly monitor the roasting beans for color and crackling sounds because the smoke, steam, and chaff are carried away by the slow moving air, and the slow speed blower generates little noise.

The operator, upon judging that stirring the beans would be beneficial or necessary, can manually control motor 24 to cause blower 70 to rotate at high speed, e.g. 6500-7000 RPM for a short 10-20 seconds. This is the stir operation shown in FIG. 10. Blower 70 generates high-speed air drawing and circulation. This action causes the mass of beans to swirl toward the outside portions of the pan 62. However, because blower 70 also applies a circumferential vector component to the blown air, the mass of beans also moves circumferentially about the pan 62. See FIGS. 4 and 6. It is noted that the beans located more toward the pan center move circumferentially more rapidly than beans located more toward the pan outer walls. However the beans may move in many ways. Close to the blower the beans may move CCW—the same direction as the blower itself; towards the outside of the bean mass, the beans may move CW perhaps due to the induced vibrations in the pan (from the motor/blower) in addition there is a radial movement of beans-downwards on the outside of the mass and upward on the inside. It is thought (though we cannot see it) that the beans move radially inward on the bottom of the mass. One can see the radial movement outward on the mass top. These movements combine to give very complex but very effective stirring.

The main purpose of this swirling action is to stir the beans and to separate chaff and remove chaff and smoke and steam, not to cool the mass of beans because the roasting thereof has not completed. Accordingly, the high-speed blower cycle should be short and the power to element 40 should remain on during these high-speed cycles. During roasting, the beans become gradually lighter due to removal of moisture and coffee oils, and also increase in dimension (i.e. expand) and become less dense. With this method of mixing the lighter less-dense more-roasted beans migrate to the top or are thrown up higher than the denser less-roasted beans during mixing, vibrating and stirring. So the less-roasted beans should be closest to the heating surface once a mixing cycle is complete and the beans have redistributed and come to rest.

Air as a stirring medium gives us completely unbroken beans—a consistent problem with prior devices. The fan only stirring operation has a number of advantages. When a roast is complete there is still residual heat in the pan. If one is roasting repeated roasts of the same beans to the same doneness (as a coffee house or restaurant might choose) one would use the retained automatic parameters selected for the first roast. However one would use "fan only" operation with the heater off to bring the roaster back to the original ambient conditions before beginning subsequent roasts; otherewise the results would not be consistent.

Once the beans are sufficiently stirred, the operator or the system automatically, shifts the blower to slow speed to start the second vent cycle of FIG. 10, and the beans come to rest again on the pan bottom. Some beans will initially remain piled up along the sidewall. However, the natural vibration of the system tends to cause the beans to spread out somewhat toward the pan center. To better redistribute beans after stirring, it is preferred to gradually de-accelerate the blower so the centrifugal force is decreased and as the blower slows down beans are deposited in an ever-decreasing circle on the pan bottom. As the blower goes through its resonant speed on the way down, vibration causes the mass of beans to move towards the center from the outside. If desired, the pan bottom can have a slight central, conical slope from the outer edge. A 12-inch pan may have a 1 to 2 inch descent and a smooth surface inside the pan to distribute the beans across the surface more evenly. The slow vent cycles and high-speed stir cycles can be repeated as desired until the beans are fully roasted and show a desired color, sheen, sound, and/or odor. In one example, the slow speed cycles extended for 3-4 minutes and the high-speed cycles extended for about 20 seconds. The beans were fully roasted in 3-4 complete cycles.

Once fully roasted, it is preferred that the beans be quickly cooled to preserve flavor in the beans and preserve the condition (done-ness) or roast completion at which the roasting was stopped. System 50 applies rapid cool down by simply operating blower 70 at high speed and cutting power to rod 40. As mentioned above, this action draws cool air into the systems, swirls the beans to cool them, and forces heated air out through the filtering system. In one example, the cool down cycle lasted 6-9 minutes. Cover assembly 52 was then removed and the cooled beans placed in jars for storage. These beans were later ground and used to make a fresh coffee beverage.

Although alternating low air speed phase and high air speed phase are mentioned above, it is within the principles of the present invention that other air off phases or intermediate air speed phases and transition phases can be employed with the present systems and methods as desired.

It should be understood that, as long as the amount, coffee type, and required roast result remain the same, parameters can be pre-programmed for the automatic mode of operating systems 10 and 50. Results from these preprogrammed systems would be substantially uniform from roast-to-roast. Systems 10 and 50 are also relatively quiet permitting the operator to hear all crackling sounds. The beans roast while at rest so that the operator can see the color of individual beans see the slight movement of individual crackling beans, and hear the crackling. The present method also enables the beans to retain a significant amount of their natural oil while eliminating moisture, which produces a better-flavored product. A blower wheel with radial and/or curved blades creates a strong current at air to cool the beans, carry the chaff, and enough static pressure head to push air through a 0.1 micron filter. Also, it uniquely creates a swirling motion, (not just a radial motion) which rotates and turns over the entire bean mass, thereby cooling and/or mixing the beans very efficiently. With the present system 50, the balance between blower, filter, motor, heater 40, smoke, cooling are such that this process is balanced and can be based on a 20-amp 115 volts circuit, i.e. US standard house kitchen circuit power, if desired. The present invention also facilitates a scaled up system so that more coffee beans can be roasted in a given roast cycle. For example, a 24-inch diameter pan can be used with generally a 220-volt 20-amp circuit to roast about 7 pounds of green beans. Also, a drop or rise in line voltage will not significantly affect the roasting cycle because conduction heat transfer varies with temperature difference. For example, a ±10% line voltage variation results in a heat transfer variation, which is insignificant to the overall cycle when compared to the known systems of fluidized bed or drum type, which rely on radiant heat transfer. In the present invention, it is possible to roast 2 or more green pounds of beans in one operation. Of course the beans lose weight in the roasting process.

FIG. 11 illustrates an embodiment using a programmed IC chip CH1 in controller 30 to effect operations such as the one shown in FIG. 10. Here, input lines from the panel PA1 on the controller 30 enter instructions determined by the operator to the chip CH1, and output lines send operating and timing commands to the motor 24 that drives the blower 26 and the resistive heater 40, the latter in the form of a coil or cal rod, that heats the bottom or pan 12. FIG. 12 illustrates an embodiment of a panel PA1 on the controller 30 that permits an operator to enter the instructions to the chip CH1. The panel PA1 includes an Up switch or key UK1, a Down switch or key DK1, a Start-Stop switch or key SK1, a Total Time switch or key TK1, an Auto/Manual switch or key AK1, and a Select switch or key SK1, collectively identified as switches SW1 and respectively connected to input lines to the chip CH1 for transmitting instructions to the chip. A Heat LED HL1 responds to the chip CH1 to light when the heater 40 is on, and a Cool LED CL1 responds to the chip CH1 when the motor 24 drives the blower 26 while the heater 40 is off.

In general an operator can use a preset automatic mode or can use a manual mode. The steps and timing used in the manual mode for one type and quantity of beans for a particular roast completion or "done-ness" can be memorized and used to control subsequent automatic operations on similar types and quantities of beans for that particular roast completion or "done-ness".

In the manual mode of operation the operator starts the roast with the start/stop key SK1 and observes the roasting process and decides visually whether the beans have reached the operator's desired "done-ness". The operator then ends the process by hitting the start/stop key SK1. This sets the total time that the chip CH1 memorizes. In the automatic mode, the operator hits the start/stop key SK1 and the roast continues for a total time that the chip CH1 has memorized from a preset time entered by the factory, has memorized from a preset time more recently entered by the operator, or has memorized from a more recent manual operation.

In addition, in either the manual or automatic mode, the operator can accept factory presets for a number of operating conditions, select the operating conditions, or accept previously selected conditions. Examples of such conditions are vent times, stir times, stir speeds, etc. According to an embodiment, certain conditions can be set as defaults to which the operator can return at any time. The conditions are entered to control various steps in the process.

During the roasting, the blower 26 alternately runs at a speed to vent the beans and to stir the beans while the beans are being heated. The panel PA1 includes a display DI1 responsive to the chip CH1, and actuated by successive operation of the select key SE1, to indicate values such as the vent speed of the blower 26, vent time, and stir speed of the blower, and the stir time. LEDs collectively identified as LE1, and connected to lines in the chip CH1, light to indicate which value is being displayed in the display DI1 in response to the select key SE1. Specifically, a stir speed LED SL1 lights when the select key SE1 causes the display DI1 to indicate the stir speed, a stir time LED ST1 lights when the select key SE1 causes the display DI1 to indicate the stir time, a vent speed LED VL1 lights when the select key SE1 causes the display DI1 to indicate the vent speed, and a vent time LED VT1 lights when the select key SE1 causes the display DI1 to indicate the vent time.

The switches SW1 and LED indications are examples only and other embodiments may use other indications, switches, and displays.

In operation of the system including the chip CH1, one embodiment involves turning on a main power switch PS1, which causes the chip CH1 in the controller 30 to make the system power up in the idle (off) condition. The chip CH1 then keeps a heater relay of the heater 40 and speed control of the blower 26 off. Pressing the Auto/Manual switch or key AK1 once selects the manual mode of operation and the chip turns the Manual LED ML1 indicator ON. Pressing the Manual/Automatic Switch or key AK1 again selects the automatic mode of operation. This turns the Auto LED AL1 on. The display DI1 then shows the total time that was previously set and a total time LED LE1 lights. If total time was not set then the display indicates 00.

Pressing the Manual/Automatic Switch or key AK1 again selects the fan-only mode of operation. In this mode the heater 40 is off and the cool LED CL1 is on. The fan-only mode of operation cools off the pan for subsequent roasts. It also works as a medical air cleaner. Selecting the fan-only mode causes the display DI1 to show FO. Pressing the Manual/Automatic Switch or key again selects the idle mode. This turns the manual and automatic LEDs OFF and the display off. The idle mode is a non-functional mode. In the idle mode the controller 30 does not cause the system to perform any function.

Pressing the Start/Stop Key SK1 starts the manual or automatic cycle selected by the Auto/Manual key SK1. Pressing the Start/Stop Key SK1 again in the selected Auto/Manual mode stops a running automatic or manual cycle. Pressing the Start/Stop Key SK1 starts and stops a fan only cycle. When a manual cycle is running, pressing the Start-Stop switch SK1 causes the cool cycle to begin and the Cool LED CL1 to light.

Pressing the Total Time key TK1 enables the Automatic Total Time Set mode. Pressing the Total Time key TK1 again cancels the Automatic Total Time Set mode. Total Time settings vary from 0 to 50 minutes in one-minute increments. Pressing the Start/Stop key SK1 in the Automatic Mode causes the chip CH1 to make the Total Time revert back to the preset value. The Total Time Key SK1 remains disabled until the Automatic mode is chosen. 50 minutes is the maximum preset time. After that the device is turned off for safety purposes.

Pressing the Select key SE1 sequentially generates different functions. A first Select key SE1 press enables the vent (or stage one) time set mode and the vent time LED VT1 lights, i.e. turns ON. Then each press of the Up key UK1 increments the vent time from 1 minute to 3 minutes in 0.2 minute increments. Pressing the Down key DK1 sequentially increments the vent time from 3 minutes to 1 minute in 0.2 minute increments. The selected value is the one last chosen by the operator.

Pressing the select key SE1 thereafter disables the vent time set mode and enables the vent voltage set mode, which the vent speed LED VL1 indicates by turning ON. Pressing the Up key UK1 sequentially shifts the vent voltage from 20 to 30, to 40, and 50 in 10 volt increments. The display responds in changes from 1 to 4. Pressing the Down key DK1 decrements the vent voltage back in 10 volt increments. These voltages are the voltages applied to the motor 24 to control the blower 26. In an embodiment, the motor 24 is kick started for a short time with 25 volts before reducing it to the lowest 20 volt setting. The selected value is the one last chosen by the operator.

The next press of the select key SE1 disables the vent voltage set mode and enables the stir (or stage two) time set mode so the stir time set LED SL1 turns ON. Pressing the Up key UK1 advances the stir time setting changes from 12 to 48 seconds in 12 second increments with the display showing increments of 0.2, 0.4, 0.6. 0.8 minutes. Pressing the down key DK1 decreases the stir time setting changes from 48 to 12 seconds in 12 second increments with the display showing increments of 0.8, 0.6, 0.4, 0.2 minutes. The selected value is the one last chosen by the operator.

The next select key SE1 press disables the stir time set mode and enables the stir voltage set mode as indicated by the stir speed or voltage LED SL1 ON. Pressing the Up key UK1 advances the stir voltage from 70 to 110 in 10 volt increments, and this appears in display selection as 1-5. Pressing the Down key DK1 decrements the stir voltage from 110 to 70 in 10 volt increments, and this appears in display selection as 5-1. The selected value is the one last chosen by the operator.

The next press of the select key SE1 disables the stir voltage set mode and turns the stir time LED ST1 and stir speed LED SL1 OFF. Selected values are used in both the manual and automatic modes. The selected value is the one last chosen by the operator.

According another embodiment the process begins with a stir period.

The manual mode operates in a manner identical to the automatic mode except the operator must press start/stop key SK1 to stop the running heat cycle. The chip CH1 transfers the elapsed time at the moment that the start/stop key SK1 is pressed to stop the running heat cycle, and stores it as the total time that may be used in the automatic mode. The elapsed time in manual mode begins counting up from 0 to 50 minutes when the start/stop key SK1 is pressed. The total time in automatic mode begins counting down from the preset time to 00. The heater turns off when the total time reaches 00 and the cool down mode begins. In the manual mode, when there are no factory sets present, the user keeps operating the system and sees when the beans are done, in say 22 minutes. That time and other presets are transferred to the automatic mode. The latter then sets the operation for the same time and presets. The operator then uses the automatic mode if the operator wishes next roast to roast the same quantity of green beans to the same degree of done-ness. A restauranteur, for example, can manually produce a new batch and then arrange to roast other batches of the same beans in the same quantity transferring the results to the auto operating mode.

In both the automatic and manual operations, the stir voltage of 70, 80, 90, 100, 110 volts has a time duration of 5 seconds at 120 volts (full speed) then changes to the preset voltage. Also, the ramp time periods divide into 5 increments of 2, 3 and 4 seconds (10/5=2, 15/5=3 and 20/5=4). The stir cycle includes ramping up and ramping down.

Operation in the fan-only mode occurs with the heater off and the fan voltage at 80 volts. A cool down mode is, for example, 5 minutes at 90 volts and lasts 2 minutes at 110 volts for a total of 7 minutes.

According to an embodiment, the chip CH1 exhibits a number of preset settings at power up, for example:

Presets at power up permit an inexperienced operator to obtain a high quality result without adding additional data. There are many different variations. An example of such presets for one pound of beans is:

Total Time Maximum Set Time: 50 minutes (not changeable). This is a safety preset.

Vent Time: 1.6 minutes

Vent Voltage: 30 Volts, display selection 2

Stir Time: 12 seconds (0.2 minutes)

Stir Voltage: 80 Volts, display selection 2

Cool Down Duration: 7 minutes (not Changeable)

The last 5 seconds of stir are at the highest speed available at 110 to 120 VAC. At the conclusion of the 5 seconds at full speed the stir preset speed is restored and will ramp down to vent setting.

If no other data is entered, these presets will govern operation in manual or automatic modes. They enable an inexperienced operator to achieve an excellent roast of about one pound of green beans regardless of the bean type, merely by hitting the start button.

A user has the option of operating the roaster in the manual or automatic mode. If the user is unfamiliar with the machine or wishes to rely upon factory presets based on prior investigations of satisfactory results, the user can select the automatic mode. On the other hand, if a user has some expertise in roasting to the user's individual taste, the user may operate the system in the manual mode. After operation in the manual mode, the controller 30 memorizes the user's manner of operation in the manual mode, and resets the controller 30 so that, in the automatic mode, the system repeats the operation as practiced by the user in the manual mode. The user can repeat the operation again and again in the automatic mode, or operate again in the manual mode to reset the operation in the automatic mode.

The manual mode allows judgment of total time. In automatic a 00 comes up on display, and the user must hit the up and down keys UK1, DK1 for total time or simply uses the inputs of manual The following is an example of an automatic operation according to an embodiment. A user plugs the unit into 120 VAC 60 Hertz and Turns on Power Switch PS1. The display shows 5 E.

The total time key TK1 is enabled only if the controller 30 is not in any of the manual, automatic, or fan-only modes. If needed the user can turn off these modes.

The user presses Total Time Key TK1. The total time must be set prior to selecting the automatic mode of operation. (This is not a condition for the manual mode because the time counts up from 0 during operation) In the automatic mode, the display DI1 shows 0 with the total time LED LE1 on, and the user enters the total time with the Up key UK1 or Down key DK1 to the desired total time. If needed, to cancel any previous total time entries, the user presses Total Time Key TK1 to cancel Total Time previously set.

The user presses the Manual/Automatic key AK1 and selects the automatic mode. This turns the automatic LED on.

The user presses the Start/Stop Key SK1 to start the cycle. Factory presets for vent fan voltage, vent time, stir fan voltage and stir time are used unless the user has set other values. The user also has the option to press the select Key SE1 and up key UK1 and down key DK1 to other values to change the factory settings or any other previous settings before pressing the Start/Stop Key SK1. Again, the selection must be made prior to selecting the manual, automatic or fan-only mode. Control will not start in the automatic mode if Total Time is not set.

In automatic the display DI1 will continue to display the time remaining and alternate between vent and stir until the total time drops to 00 or the user presses the stop/start key. In the automatic mode, the display counts up and in the manual mode it counts down.

When the total time counts down to 00, the heater 40 turns off and the Cool Down Stage begins at a fan voltage of 90 volts. The last 2 minutes of the cool down period occurs at 110 volts. The display and heat LED are off during the cool down period. The cool LED is on.

When the 7 minute cool down period is complete, the fan and cool down LED turns off.

If a second automatic cycle is started without the power switch being turned off and back on the total time will begin at the previous starting time.

The following is an example of a Manual Operation according to an embodiment. Here, if the unit is not yet plugged in, a user Plugs the unit into 120 VAC 60 Hertz source and Turns on the power switch PS1. The display DI1 then exhibits an indication such as 5E.

The user presses the Auto/Manual key AK1 and selects the manual mode. This turns on the Manual LED ML1. The manual operation also disables the Total Time.

The user may utilize the factory presets for vent fan voltage, the vent time, stir fan voltage, and stir time, and then press the Start/Stop Key SK1. On the other hand, the user also has the option of pressing the select Key SE1 and up key UK1 and down key DK1 to other values to change the factory settings or any other previous settings before pressing the Start/Stop Key SK1. The user presses the Start/Stop Key SK1 to start the roasting cycle.

During the roasting cycle the display DI1 shows the elapsed time. Once started, the roasting cycle alternates between vent and stir as shown in FIG. 11. The user observes the condition of the beans, and when satisfied with their state, presses the start/stop key SK1. If the user fails to stop the cycle before a default elapsed such as 50 minutes, the roasting cycle ends.

When the start/stop key SK1 is pressed or the elapsed time reaches the default time such as 50 minutes the heater turns off. The Cool Down Stage then begins at a fan voltage such as 90 volts and continues for a period such as 7 minutes. The last 2 minutes of the 7 minute cool down period is preferably at a higher voltage such as 110 volts. During the cool down period, the display DI1 and heat LED HL1 are off and the cool LED CL1 on.

When the 7 minute cool down period is complete, the fan and cool down LED turn off.

The controller 30 stores the elapsed time from pressing of the start/stop key SK1 to start the cycle to the actuation of the start/stop key to end the cycle, or the default time such as 50 minutes stops the cycle, in a total time memory. That time will be displayed when the total time key is pressed with the automatic mode selected.

Fan-Only Mode

The user Plugs unit into a power source such as 120 VAC 60 Hertz and Turns on Power Switch PS1.

The user presses the Manual/Automatic key AK1 to select the fan-only mode. The fan-only mode will be indicated with F0 being displayed on the display.

The fan turns on at 80 volts when the user pressed the start/stop key SK1.

The fan and display turns off when the user presses the start/stop key again. The display DI1 will show 5E.

According to embodiments of the present invention the beans receive substantially all the heat conductively. In all embodiments they receive the major heat application conductively. This contrasts with other systems where beans substantially receive all the heat by radiation or convection. The total heat required according to embodiments of the invention is substantially less than with radiant or convection heating systems.

The use of the fan during operation makes it possible to view the process by getting rid of smoke, oils, and moisture on the glass. The stirring during operation moves the beans against each other, so they knock against each other, to dislodge the bean chaff. According to an embodiment the blower operates at different speeds to stir the beans at different speeds and harmonic vibrations caused by stirring spread out the beans and mixes them.

The chaff screen removes the chaff and the HEPA or ULPA filter removes smaller particulate matter. The inside chaff screen prevents the chaff from clogging the HEPA or ULPA filters.

According to one embodiment of the invention, the user loads ½ pound or approximately 750 beans, enough to make approximately 15 cups of coffee. According to another embodiment of the invention, the user loads 1 pound or approximately 1,500 beans, enough to make approximately 30 cups of coffee. According to another embodiment of the invention, the user loads 2 pounds or approximately 3,000 beans, enough to make approximately 60 cups of coffee. According to other embodiments of the invention, the number of beans may be more or less and the resulting cups of coffee need not reach exactly these amounts.

According to an embodiment of the invention, the user affirms that the process has completed and the beans are done visually. Blowing away the chaff and smoke helps this visual confirmation.

According to another embodiment, an ULPA (Ultra-Low Penetration Air) filter is used in place of the HEPA (High-Efficiency Particulate Air) filter. HEPA Filters are rated 99.99% efficient with particles 0.3 microns and larger in diameter. ULPA Filters are rated 99.999% efficient with particles 0.1 microns in diameter.

The "fan only" function, which operates with the heater off, serves several purposes. It removes residual heat between consecutive roasts each performed on new batches of beans. This is important because the reproducibility of the second, third, and fourth roasts, etc. depends upon the beginning ambient temperature being substantially the same if the same roasting time is used. However, at the end of each roast the pan is still warm after removal of the beans. Using the fan in the fan-only mode for two or three minutes removes the residual heat and helps assure virtually the same ambient starting temperature. In addition, letting the fan run continuously in the fan-only mode with the heater off (automatic by chip) filters the air passing through the filter of matter down to 0.1 microns. This removes most pollens, dust, allergens, pollutants down to the 0.1 micron range.

Embodiments of the invention permit an experienced person to make individual roasts for special beans. In the manual mode set, the operator can input values that let roasting continue till the operator sees the roast is done. The chip CH1 enters the value in Auto and the inputted values will be repeated in the automatic mode. To alter the values, the operator inputs new values in the manual mode. This furnishes the system the effect of repeatability of operation.

The intermittent venting and stirring allows supervision of the roasting process and results in the ability to handle large quantities of beans in one roast, such as ½ to 2 pounds of beans. Prior art devices have small range of loads, and with moderate range of loads cannot supervise the beans' condition or even measure environment. According to the embodiments disclosed, the operator looks at beans, judges beans' done-ness, and filters out small particles that lets one smell the done-ness of beans. Various of vent-speed vent-time, stir-speed stir-time may be sued. This offers flexibility for various beans.

The aforementioned embodiments offer the advantage of employing only one moving part for the stirring of the beans, namely the blower that serves as a single actuator.

According to another embodiment of the invention another blower is added to the end of the motor shaft and the air is applied toward the outer periphery of the pan to provide additional stirring of the beans.

Figure 13:
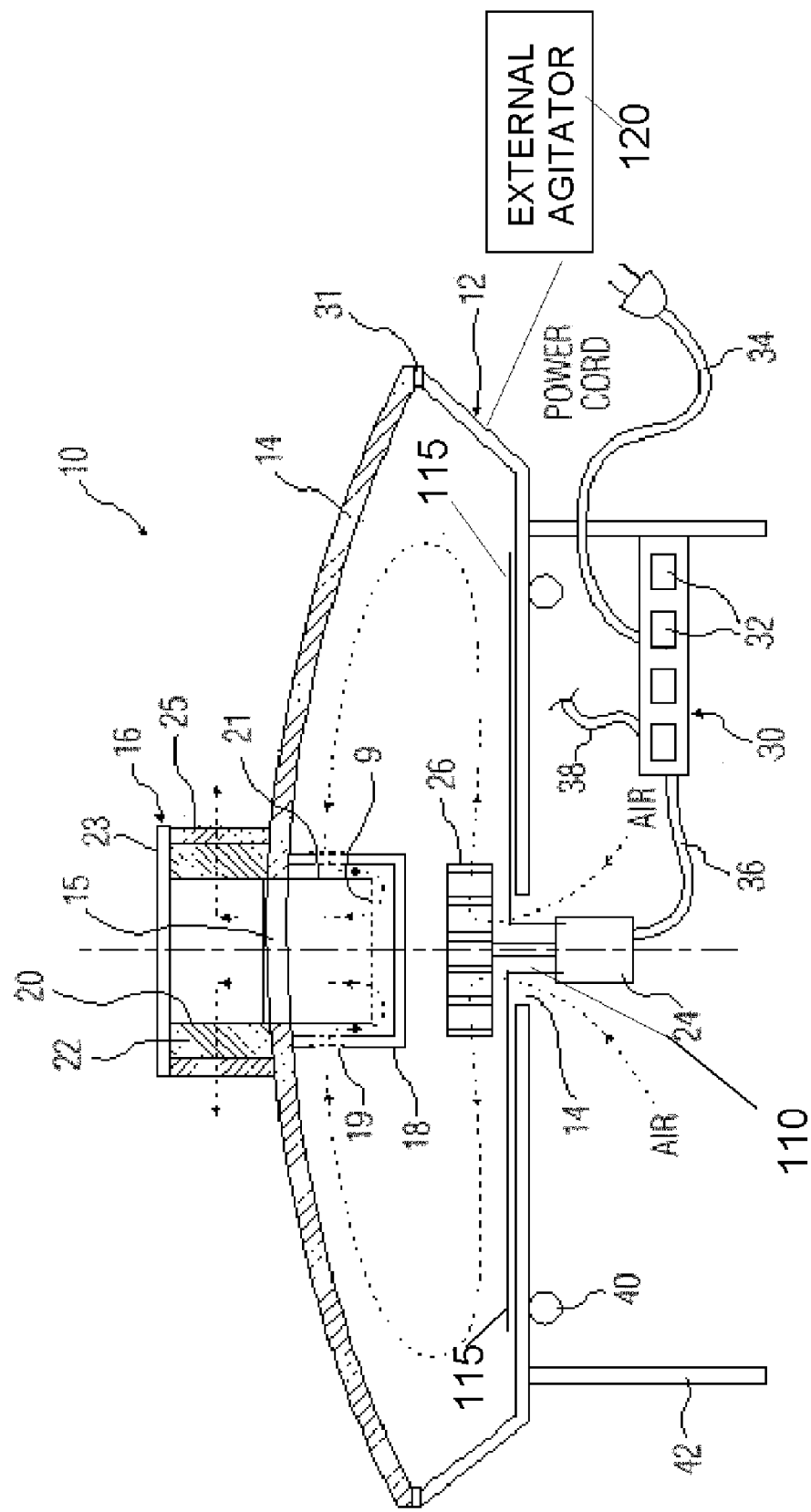
FIG. 13 illustrates yet another embodiment of the invention.

According to another embodiment shown in FIG. 13, a sleeve 110, connected to the motor 24 and surrounding the shaft of the motor 24, and coupled by gearing to the motor 24, drives an internal mechanical stirrer 115 to increase agitation to portions of the beans. According to another embodiment, an external agitator 120 vibrates the pan 12 to create agitation of the beans. One embodiment uses only the mechanical stirrer 115 and another embodiment uses the external agitator 120. Yet another embodiment uses both.

While embodiments of the invention have been described in detail, it will be evident to those skilled in the art that the invention may be embodied otherwise without departing from its spirit and scope.

What is claimed is:

1. A coffee bean roasting apparatus, comprising:
a roasting chamber including a surface for supporting a mass of coffee beans in one or more layers;
a heater under said surface;
a blower directed at the beans;
a controller connected to said heater and said blower;
said controller including a chip programmed to cause said controller to produce a plurality of combinations of bean done-ness by regulating the blower speed during venting and during stirring, said controller including a regulator to operate the heater and change the blower between a plurality of slower venting speeds and a plurality of faster stirring speeds to effect one or more vent and stir operations.

2. An apparatus as in claim 1, wherein said controller includes a panel for actuating said chip, said panel including a plurality of switches that permit an operator to enter instructions to said chip, said controller being programmed to repeat cycles in the changes in the venting speeds and stirring speeds to obtain a desired roasting effect.

3. An apparatus as in claim 1, wherein said panel includes a start-stop switch that actuates the chip to start heating operation, a total time switch that actuates the chip to end heating, and an auto/manual switch that actuates the chip to enter an automatic operation or a manually determined operation.

4. An apparatus as in claim 1, wherein said panel includes select keys that actuate the chip to set a vent time and a stir time.

5. An apparatus as in claim 1, wherein said panel includes select keys that actuate the chip to set voltages which select blower speeds, and ramp the speeds over an infmite number of speeds.

6. An apparatus as in claim 4, wherein said keys increment and decrement the times.

7. An apparatus as in claim 5, wherein said keys increment and decrement the voltages.

8. An apparatus as in claim 3, wherein said chip memorizes the times set for manually determined operation for setting into the automatic operation.

9. An apparatus as in claim 1, wherein said chamber is horizontally circular, and a filter surrounds the circular chamber.

10. An apparatus as in claim 8, wherein said filter includes a HEPA or ULPA filter.

11. An apparatus as in claim 10, wherein a pair of chaff screens are peripherally mounted inside said filter.

12. An apparatus as in claim 1, wherein said controller permits a plurality of choices of vent speed, vent time, stir speed, and stir time, to permit flexibility for roasting different types of beans.

13. An apparatus as in claim 1 wherein said chamber includes a transparent cover to cover the beans and permit viewing the beans.

14. An apparatus as in claim 1 wherein said apparatus includes a bean roast done-ness determination device, said bean roast done-ness determination device including a transparent cover to cover the beans and permit viewing the beans.

15. An apparatus as in claim 1, wherein said blower is connected to a motor, and a second blower is also connected to the motor.

16. An apparatus as in claim 1, further including a mechanical stirrer for the beans.

17. A coffee bean roasting apparatus, comprising:
a roasting chamber including a surface for supporting a mass of coffee beans in one or more layers;
a heater under said surface;
a blower directed at the beans;
a controller connected to said heater and said blower;
said controller including a chip programmed to cause said controller to operate the heater and change the blower between a slower venting speed and a faster stirring speed to effect one or more vent and stir operations;
the blower having a resonant speed and the controller ramps the speed of the blower up and down through the resonant speed of the blower to produce vibrations to induce the mass of beans to spread fairly evenly over the surface.

18. An apparatus as in claim 17, wherein said controller includes a panel for actuating said chip, said panel including a plurality of switches that permit an operator to enter instructions to said chip, said controller being programmed to repeat cycles in the changes in the venting speeds and stirring speeds to obtain a desired roasting effect.

19. An apparatus as in claim 17, wherein said panel includes a start-stop switch that actuates the chip to start heating operation, a total time switch that actuates the chip to end heating, and an auto/manual switch that actuates the chip to enter an automatic operation or a manually determined operation.

20. An apparatus as in claim 17, wherein said panel includes select keys that actuate the chip to set a vent time and a stir time.

21. An apparatus as in claim 17, wherein said panel includes select keys that actuate the chip to set voltages which select blower speeds, and ramp the speeds over an infinite number of speeds.

22. An apparatus as in claim 20, wherein said keys increment and decrement the times.

23. An apparatus as in claim 21, wherein said keys increment and decrement the voltages.

24. An apparatus as in claim 19, wherein said chip memorizes the times set for manually determined operation for setting into the automatic operation.

25. An apparatus as in claim 17, wherein said chamber is horizontally circular, and a filter surrounds the circular chamber.

26. An apparatus as in claim 25, wherein said filter includes a HEPA or ULPA filter.

27. An apparatus as in claim 26, wherein a pair of chaff screens are peripherally mounted inside said filter.

28. An apparatus as in claim 17, wherein said controller permits a plurality of choices of vent speed, vent time, stir speed, and stir time, to permit flexibility for roasting different types of beans.

29. An apparatus as in claim 17 wherein said chamber includes a transparent cover to cover the beans and permit viewing the beans.

30. An apparatus as in claim 17 wherein said apparatus includes a bean roast done-ness determination device, said bean roast done-ness determination device including a transparent cover to cover the beans and permit viewing the beans.

31. An apparatus as in claim 17, wherein said blower is connected to a motor, and a second blower is also connected to the motor.

32. An apparatus as in claim 17, further including a mechanical stirrer for the beans.

* * * * *